United States Patent
Meyercord

[15] 3,684,110
[45] Aug. 15, 1972

[54] TILT DOLLY

[72] Inventor: John C. Meyercord, Harlingen, Tex.

[73] Assignee: Meyercord Industries, Inc., Harlingen, Tex.

[22] Filed: Nov. 12, 1970

[21] Appl. No.: 88,840

[52] U.S. Cl. .............................. 214/370, 214/77 R
[51] Int. Cl. .................................... B62b 3/04
[58] Field of Search ...280/79.1, 47.34, 47.29; 254/8, 254/3; 214/370, 384, 77, 1 S, 1 D

[56] References Cited

UNITED STATES PATENTS

| | | | |
|---|---|---|---|
| 402,341 | 4/1889 | Martin | 280/79.1 |
| 878,751 | 2/1908 | Schreiber | 214/77 R |
| 915,721 | 3/1909 | Aldous | 214/77 R |
| 2,011,627 | 8/1935 | Graham | 254/3 C |
| 2,627,425 | 2/1953 | McNamara | 280/79.1 |
| 3,138,265 | 6/1964 | Hansen | 214/370 |
| 3,411,802 | 11/1968 | Diller | 280/79.1 |

*Primary Examiner*—Philip Arnold
*Attorney*—Wofford and Felsman

[57] ABSTRACT

A dolly characterized by a fully maneuverable, substantially planar structure and body having no handles or lateral protuberances to interfere with passage through doorways, the body having a non-marring, substantially planar upper surface and a short protrusion that is substantially normal to the upper surface for receiving the edge of an article to be tilted thereonto. The body, or a portion thereof, is tiltable to enable engaging the vertical protrusion beneath one edge of the article to be moved. The dolly is lightweight and readily carried by a single mover. Also disclosed is a preferred method of forming the non-marring surface of the body.

6 Claims, 7 Drawing Figures

PATENTED AUG 15 1972  3,684,110
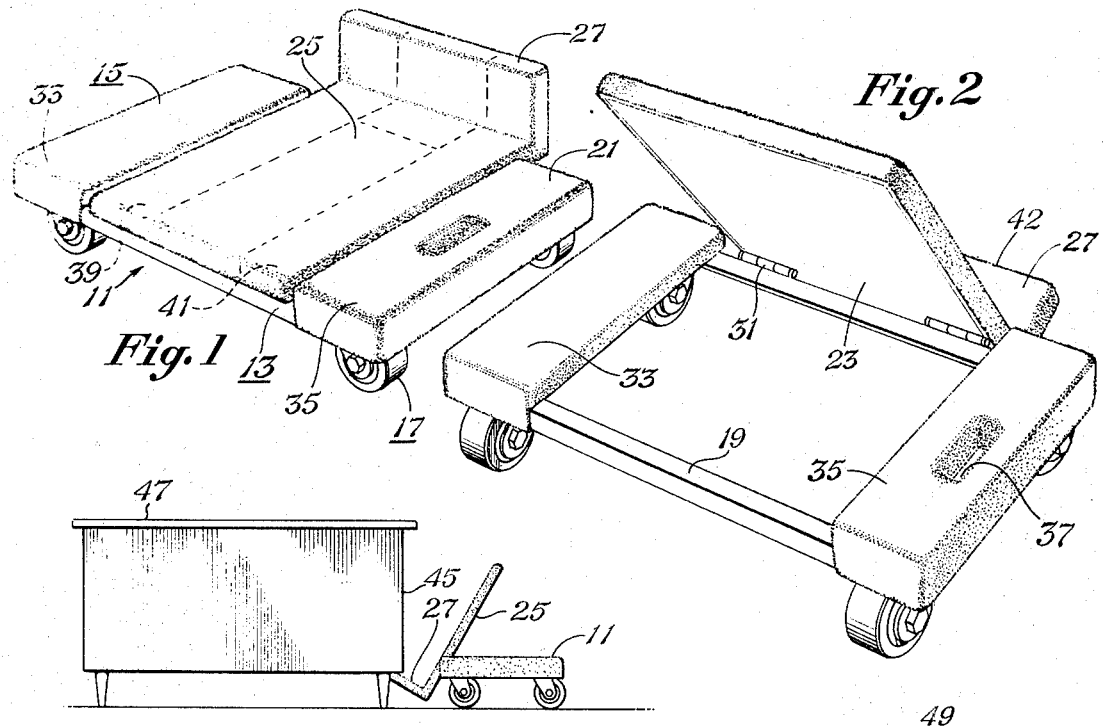
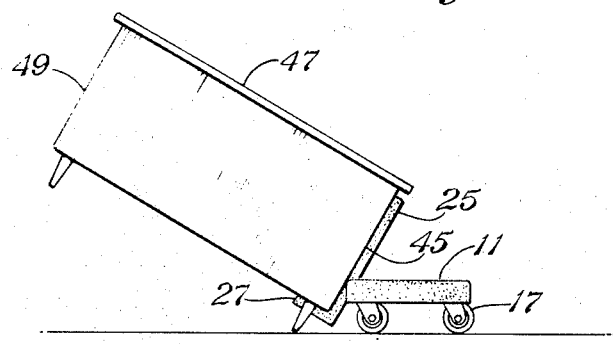
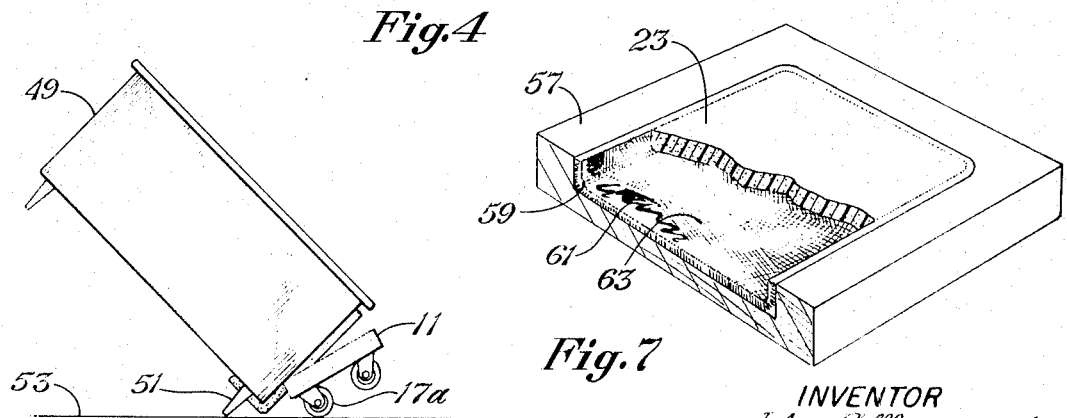
INVENTOR
John C. Meyercord
BY
Wofford & Felsman
ATTORNEYS

TILT DOLLY

BACKGROUND OF THE INVENTION

1. Field of the Invention

This invention relates to dollies for moving articles. More particularly, it relates to portable, fully maneuverable dollies for being placed beneath articles; such as desks, credenzas, and other furniture; to enable moving the articles by a single mover.

2. Description of the Prior Art

The prior art is replete with a wide variety of different types of dollies. These dollies have ranged from simple two-wheel dollies with elongated semi-vertical handles, through simple flat four-wheel dollies, to elaborate four-wheel dollies having elongated semi-vertical handles that are positionable onto a base. The more elaborate dollies have been expensive, have been difficultly maneuverable, and have not been portable and employable by a single mover. Since the prior art dollies have required a plurality of movers; one mover to tilt the article onto the dolly while the other mover manipulates the handles; they have been costly. Because of the protuberances on the dolly, passage through doorways has been restricted, frequently requiring replacing an object on the dolly a plurality of times, again increasing costs. The simple flat four-wheel dollies also were costly for one of the following reasons. They either required two movers, one to keep the dolly emplaced beneath the article while the other mover tilted the article onto the dolly; or they required expensive brake systems to keep the dolly from rolling from beneath the article. Moreover, the brake systems were frequently inadequate to prevent the dolly from rolling from beneath the article as it was tilted onto the dolly. Also the brake systems required adjustment and repair.

Thus, the prior art has not provided a dolly having the following features:

1. a dolly that is universally maneuverable and that can be emplaced beneath one end of the article to be moved, having dimensions less than the object to be moved; and in a particular embodiment less than the 30 inch standard doorways; so that the article could be turned any way to pass through the doorway without having to replace it on the dolly; yet that had a structure enabling at least a portion of the dolly to be tilted and caught beneath one end of the article to be moved such that the dolly would not roll from beneath the article as a mover lifted the other end to tilt the article onto the dolly;
2. a dolly that also has a substantially planar, non-marring upper surface for receiving furniture without leaving any marks on the furniture;
3. a dolly that also has all four wheels universally swivelable; and
4. particularly, a lightweight dolly having a non-marring upper surface and supporting body that was preformed, yet light enough in weight to be carried and employed by only one mover.

BRIEF DESCRIPTION OF THE DRAWINGS

FIG. 1 is an isometric view of a dolly in accordance with one embodiment of this invention.

FIG. 2 is an isometric view of a dolly similar to the dolly of FIG. 1 and having hinges interconnecting the bottom of the center portion of the body with the structure.

FIGS. 3–6 are side elevational views illustrating the engagement of the embodiment of FIG. 2 with a desk and the tilting of the desk onto the dolly.

FIG. 7 is a partial cross sectional view illustrating the mold with a non-marring upper surface and a body formed in accordance with a method aspect of this invention.

DESCRIPTION OF THE PREFERRED EMBODIMENTS

It is an object of this invention to provide a dolly that obviates the disadvantages of the prior art structures and provides the features delineated hereinbefore. Specifically, it is an object of the invention to provide a lightweight, portable dolly having at least part of a structure that can be tilted to engage beneath an end of an article to be moved so that the article can be tilted onto the dolly by a single mover without the dolly rolling from beneath the article. It is an additional object to provide the dolly with a non-marring upper surface and with dimensions small enough to pass through a doorway so that full flexibility in maneuvering the article to be moved through the doorway can be achieved.

It is also an object of this invention to provide a method for effecting a lightweight body for use on a substantially planar dolly, the body having a non-marring surface for receiving an article to be moved, and a part of the body being adapted to engage the article to prevent the dolly from rolling from beneath the article as it is tilted onto the dolly.

Referring to FIG. 1, dolly 11 comprises the major elements of a structure 13, wheels 17, and body 15.

The structure 13 is substantially planar. By planar is meant that it is thin relative to its lateral and longitudinal dimensions. The structure 13 has a framework 19, FIG. 2, that structurally supports the outer dimensions of the body 15 and interconnects the spaced wheels 17. The framework 19 may be of angle, tubular, or other type construction. It may be made of steel, aluminum, magnesium, or other structurally strong, yet economical, materials; such as, hard wood like oak, or rigid plastics. Preferably, the material that is employed is both a strong and lightweight material. As illustrated, the framework 19 defines a dolly having rectangular outer shape. The shape is not critical, however, and may be varied as appropriate to the number of wheels or the articles which are to be moved.

In FIG. 1, the wheels 17 are connected with the structure 13 at each of the four corners. The preferred embodiment is illustrated in which all four of the wheels are fully swivelable to enable attaining any azimuth in response to linear force along a given azimuth. At least three wheels must be employed to effect a stable dolly. When three wheels are employed, the dolly structure may be in the form of a triangle. One of the three wheels must be universally swivelable. As indicated, four wheels are preferably employed. When four wheels are employed, at least two are universally swivelable. When all four wheels are universally swivelable, better maneuverability is attained.

The body 15 is carried by the structure 13. The body 15 has a non-marring surface 21. By non-marring surface is meant a surface that is softer than the conventional paints, varnishes or veneers to avoid scratching the surface of the article to be moved when the article is upended onto the dolly. As illustrated, the non-marring surface 21 is carpet. If desired, a molded rubber may be employed. Other non-marring surfaces; such as, foamed plastic like polyurethane foam; may be employed, if desired. The non-marring surface 21 overlies a rigid inner member 23, FIG. 2. The rigid inner member may comprise wood or reinforced foamed plastic for the requisite strength and light weight.

At least a portion of the body 15; such as, portion 25; has a short protrusion means or load bearing ledge such as short protrusion 27 at one edge that is substantially normal to its planar upper surface for receiving an edge of an article to be moved. The short protrusion 27 will protrude above the substantially planar surface of the body only a short distance for engaging beneath the end of a desk, credenza, or the like. The short protrusion need only extend for about three-quarters of an inch. Ordinarily, it may extend for several inches upwardly without adversely affecting the performance. By the term "substantially normal to the upper surface" is meant having an angle $\alpha$ of about 90° with respect to the surface. In any event, the short protrusion 27 forms an angle $\alpha$ with respect to the upper surface that is within the range of 60° to 120°.

If desired, the section 25 may be fastened to the structure 13, FIG. 1, and the entire dolly tilted to engage the short protrusion 27 beneath the end of the article to be moved. Preferably, the portion 25 is hinged by hinge means 31, FIG. 2, such that portion 25 is more readily emplaced in engagement with the end of the article to be moved without having to tilt the entire dolly. The ends 33 and 35 provide a stable base on the body 15. If desired, recessed carrying handles such as aperture 37 may be provided in one or both ends 33 and 35 to facilitate carrying the dolly.

If desired, separate arms such as arms 39 and 41, FIG. 1, may be pivotally attached to the structure instead of having the entire middle portion 25 pivotally attached. The arms 39 and 41 are shown in dashed lines, since they do not form a preferred embodiment of this invention.

The dolly has no protuberances such as long handles that would interfere with its maneuverability or passage through doorways. The portion 25 is constrained in its longitudinal extent; ordinarily, laterally of the dolly; so that it does not extend beyond the structure 13 for a distance greater than the height of the upper edge 42 of the short protrusion 27 above the floor 53, or the plane of the bottom of the wheels. This constraint facilitates engagement of the short protrusion 27 with the article to be moved. Moreover, both the lateral and longitudinal dimensions of the dolly are less than the width of a doorway through which an article is to be moved so that both the dolly and the article can readily pass therethrough. Specifically, with a conventional doorway 30 inches wide, both the length and width of the dolly are less than 30 inches.

Operation of the dolly may be seen in FIGS. 3–6. Therein, the short protrusion 27 is engaged beneath the end 45 of desk 47. Thereafter, the opposite end 49 is lifted upwardly by a mover. The short protrusion 27 maintains the dolly 11 in place so that it does not roll out from beneath the end 45. The portion 25 conformingly receives the end 45 with the short protrusion 27 extending beneath the desk. As the opposite end 49 is moved more nearly vertically over the dolly 11, the side wheels 17a begin to bear the load of the desk as the legs 51 being to clear the floor. The dolly 11 may tilt as in FIG. 5 to bear the load if the point of connection such as the axis of hinge means 31 is outside the foundation formed by the line of contact of the wheels 17 with the floor 53. The desk 47 is then upended onto the dolly as illustrated in FIG. 6 with the opposite end 49 disposed substantially vertically over the dolly 11. The dolly is fully maneuverable such that the desk can be turned to pass through any given doorway or to be maneuvered around any corner or through restricted passageways such as narrow halls. When the destination is reached, the desk may be off loaded in the same way, by the single mover. Thus, large furniture formerly requiring at least two movers can be moved by a single mover. Moreover, the dolly 11, since it is portable, may be easily carried by the single mover.

In one embodiment of this invention, a dolly body has a preformed non-marring surface that is bonded to a rigid member by a method that can be understood by referring to FIG. 7. In the method aspect of this invention, a mold 57 is formed with an internal shape conforming to the desired external shape of the body or the portion of the body such as portion 25. For example, the mold may have a short intrusion, or depression, for the short protrusion 27, although that intrusion is not specifically shown in FIG. 7. A layer of resilient, non-marring material such as carpet 59 is conformingly emplaced within the internal shape of the mold 57. For example, the layer of carpet may be stapled at strategic points to conform to the internal shape of the mold. The interior, or back, and exposed surface of the carpet 59 is then covered with a reinforced bonding material. For example, a settable plastic resin; such as, an epoxy resin 61 employing a catalyst for setting; may be sprayed or brushed onto the interior of the layer of carpet so that it covers and impregnates the carpet from the back. A layer of thin fibrous material such as glass cloth 63 is embedded in the plastic resin before the resin cures, or sets. As many layers of carpet and bonding material as desired may be employed to form a skin. As many layers of plastic resin and fibrous material as desired may be employed to effect the desired strength.

The skin thus formed by the at least one layer each of the resilient non-marring material and the reinforced bonding material is then bonded to a rigid inner member to provide the requisite final strength for the body. The skin may be bonded or affixed to the inner rigid member by any conventional way; such as by screws, adhesive, or staples; as desired. As illustrated, the rigid inner member 23 is formed by casting a foamed plastic within the interior of the skin. The entire body is then allowed to attain its cured strength before the hinge means 31 are connected thereto. The hinge means 31 are then connected thereto and connected with the structure 13, as described hereinbefore. Instead of casting the inner rigid member within the skin, the preformed skin may be bonded to a preformed rigid inner member such as a preformed wooden member.

If desired, the resilient, non-marring material may comprise rubber that is conformed to the mold. The rubber may be bonded as by glue, with or without suitable reinforcing materials such as glass cloth, to the rigid body.

The dolly has been described hereinbefore with the hinges displaced inwardly from the short protrusion means 27 to facilitate engaging the short protrusion means 27 under an end of the article to be moved. If desired, the hinge means may be placed directly under the short protrusion means 27 and aligned with the axis of the wheels to minimize tilting of the dolly in bearing the load of the article as it is tilted onto the dolly.

The dolly has been described hereinbefore in a particular aspect such as for moving office furniture. Conceivably, larger dollies may be desired for warehouses for moving larger, more cumbersome objects. In such an event, the dimensions of such larger dollies will be smaller than the doorway through which they will be maneuvered with their article to be moved. Such dimensions may exceed the standard 30 inch doorways conventionally employed in office buildings.

Although the invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. A dolly for moving articles with unsupported panels intermediate their corners, comprising:
   a. a low profile substantially planar structure;
   b. a plurality of at least three wheels connected with said dolly so as to form a stable dolly, at least one of said wheels being universally swivelable for full and easy manuverability of said dolly: said wheels carrying said low profile structure such that its height above the plane of the bottom of the wheels is less than its lateral and longitudinal dimensions;
   c. a body comprising a plurality of portions carried by said structure and defining a non-marring, substantially planar upper surface, at least one of said portions being a fixed portion that is fixedly attached to said structure and at least one other of said portions being a pivotal portion carrying a load bearing ledge at one edge thereof; said pivotal portion being mounted on said structure at the side thereof adjacent said one edge for pivotal movement about a pivot axis that is disposed exteriorly of a straight line between adjacent wheels and that has a moment arm with respect thereto such that said dolly will tilt upwardly to meet an article to be moved as it is upended thereon: said load bearing ledge being disposed exteriorly of said straight line connecting the two wheels on both sides thereof such that said short protrusion means can engage said edge of said article without said wheels encountering said article; said pivotal portion carrying said load bearing ledge being pivotal for being tilted to emplace said load bearing ledge beneath an end of and engaging an edge of said article to be moved, for preventing said dolly from rolling from beneath said article and to receive said article when it is upended onto said dolly, such that said article can be upended and loaded onto said dolly by a single mover and fully manuvered by said single mover for passage through doorways and the like without requiring any supplemental holding device and without requiring assistance from an additional worker or mover.

2. The dolly of claim 1 wherein there are a plurality of said fixed portions.

3. The dolly of claim 1 wherein said body comprises three portions, two end portions that are fixedly attached to said structure and an intermediate pivotal portion.

4. The dolly of claim 1 wherein four wheels are connected with said structure and at least two of said wheels are universally swivelable.

5. The dolly of claim 2 wherein there are a plurality of said pivotal portions.

6. A dolly for moving articles with unsupported panels intermediate their corners, comprising:
   a. a low profile substantially flat framework structure that is lightweight, and is thin relative to its lateral and longitudinal dimensions;
   b. a plurality of at least three wheels that are pivotally connected with said structure, each of said wheels being universally swivelable to attain any azimuth in response to a force imparted to said structure; said wheels carrying said structure with a low profile such that its height above the plane of the bottom of the wheels is less than its lateral and longitudinal dimensions; and
   c. a body comprising a pair of fixed end portions and at least one pivotal portion intermediate said end portions; said body being carried by said structure and defining a non-marring, substantially planar upper surface, said pivotal portion of said body having a load bearing ledge at one edge that is substantially normal to its planar upper surface for engaging an edge of an article to be moved and preventing said dolly from rolling from beneath said article; said pivotal portion of said body being mounted on said structure for pivotal movement about a pivot axis that is disposed exteriorly of a straight line between adjacent wheels and having a moment arm with respect thereto such that said dolly will tilt upwardly to meet said article as it is upended thereon; said load bearing ledge being disposed exteriorly of said straight line between said two wheels on both sides thereof such that said short protrusion means can engage said edge of said article without said wheels encountering said article.

* * * * *